March 2, 1965  W. LEVINE  3,171,411
ANESTHESIA APPARATUS
Filed Jan. 3, 1961  3 Sheets-Sheet 3
FIG. 8
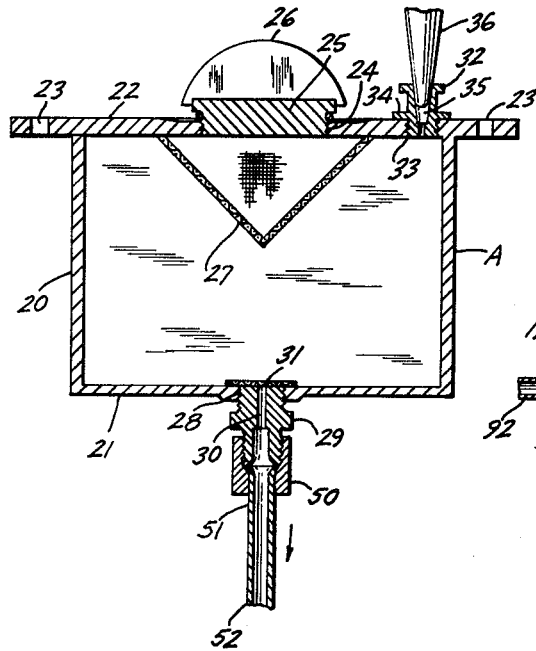
FIG. 9
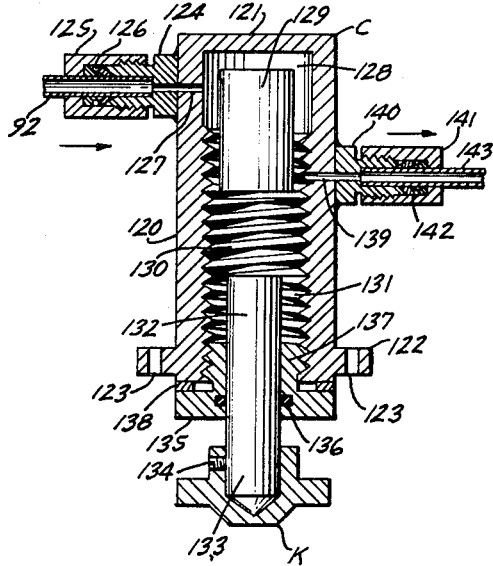
FIG. 10
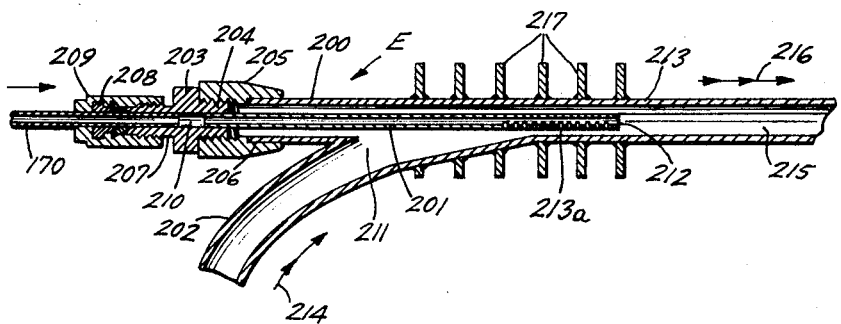
INVENTOR.
WALTER LEVINE
BY
ATTORNEY

United States Patent Office 3,171,411
Patented Mar. 2, 1965

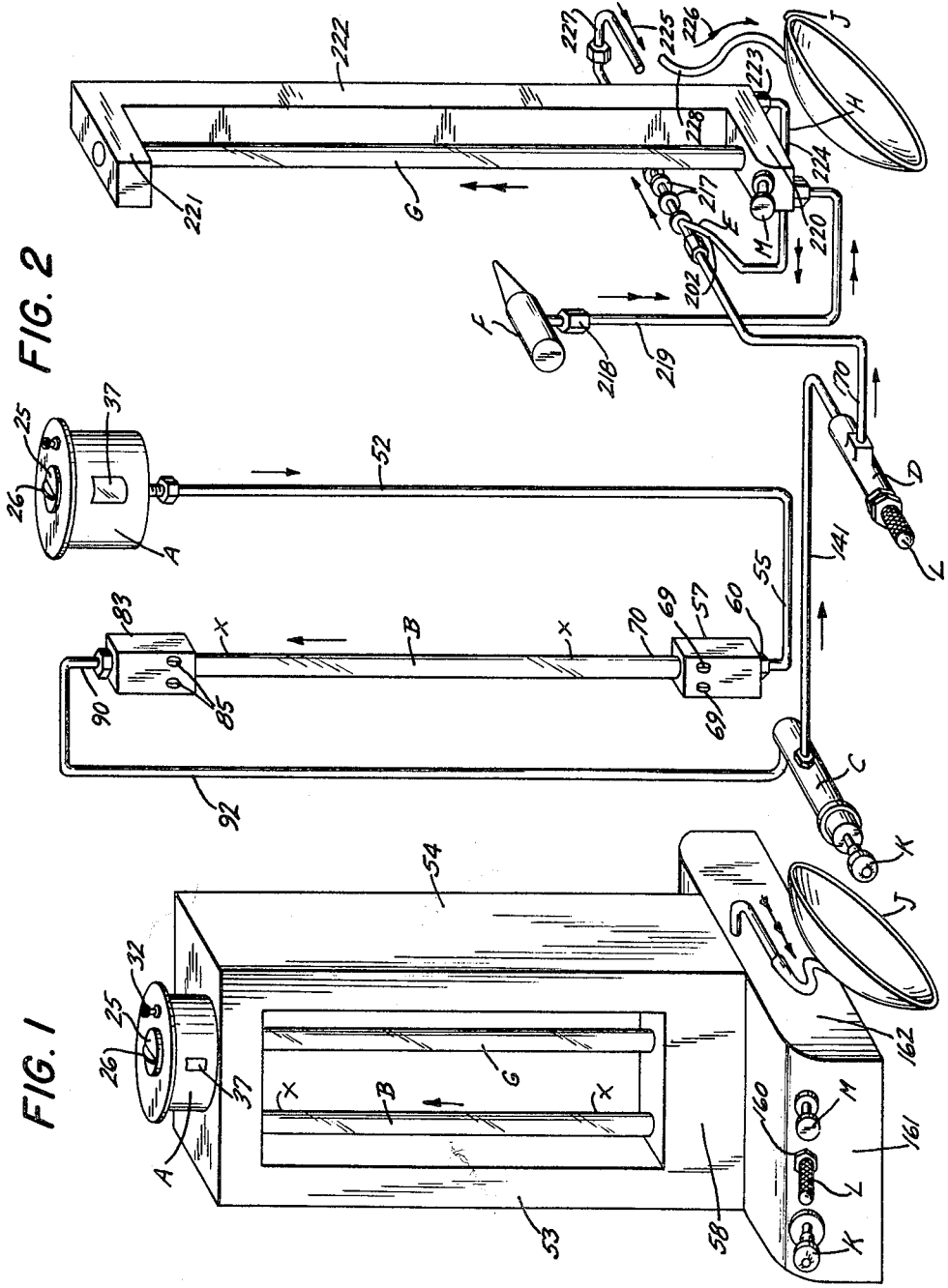

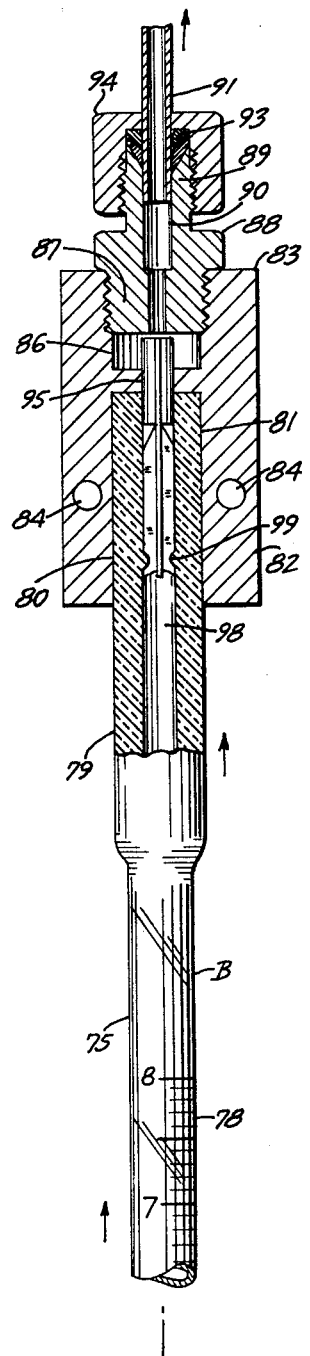
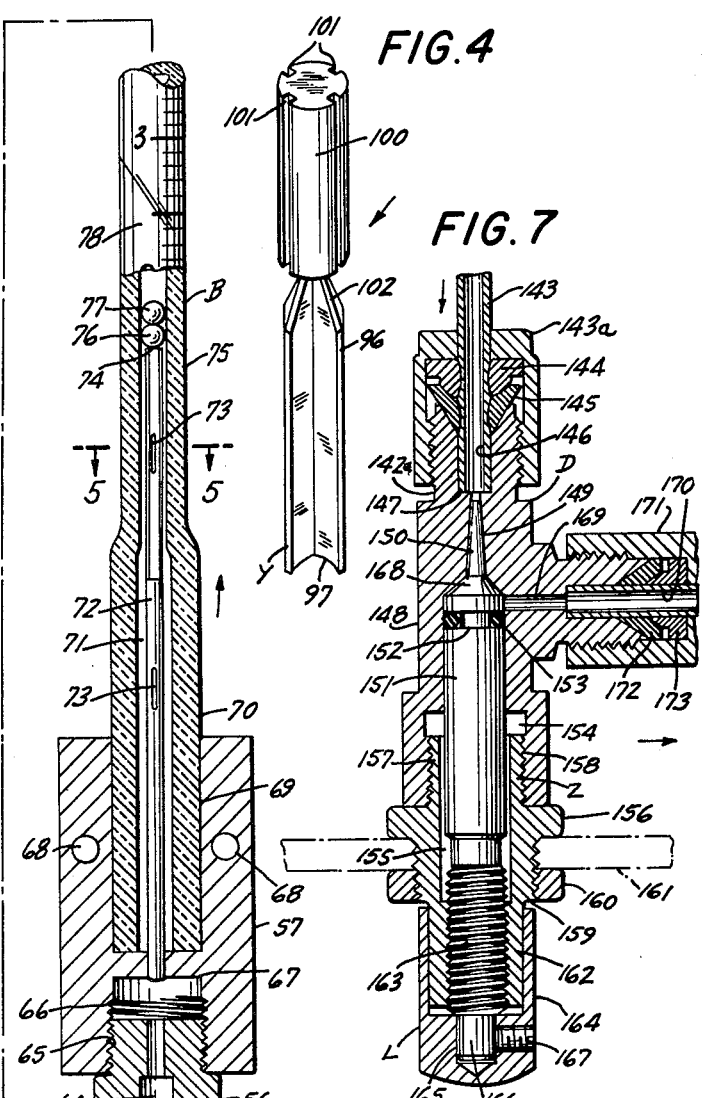
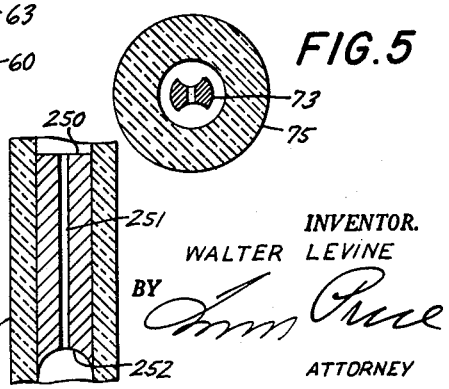

3,171,411
ANESTHESIA APPARATUS
Walter Levine, 87 Glen Cove Ave., Glen Cove, N.Y.
Filed Jan. 3, 1961, Ser. No. 80,436
5 Claims. (Cl. 128—188)

The present invention relates to an anesthetic apparatus, and it particularly relates to an apparatus for handling fluorinated anesthetic agents.

In the administration of various fluorinated anesthetic agents such as 2-bromo-2-chloro-1,1,1-fluoroethane also known as Halothane or Fluothane, it is most important that there be correct and most accurate vaporization and proportionment.

It is among the objects of the present invention to provide a novel anesthesia apparatus which will achieve accurate calibrated administration of the anesthetic agent or the fluoroethane with a minimum variation in delivered concentration regardless of changes in external pressure and temperatures and with assurance that a proper predetermined concentration will be obtained at all times regardless of rapid change in the flow rate through the apparatus.

It is among the other objects of the present invention to provide a novel anesthetic apparatus in which movement or agitation of the apparatus will not result in change of delivery nor in change of the predetermined concentration and in which the apparatus will be readily serviced and installed and readily operated by technicians without special training and skill.

A still further object is to provide an apparatus in which there may be ready setting for varying flow rates, for example, ranging from three to fifteen liters per minute with assurance that the proper concentration of anesthetic agent of 0.5 to 1% will be maintained at all times.

A still further object of the present invention is to provide a novel apparatus for administering fluoroethane with assurance that at all times the concentration will never be permitted to exceed 2%.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects according to one embodiment of the present invention, it has been found most satisfactory to utilize a reservoir which may be separate from or integral with the anesthesia apparatus and which in one form may have a diameter of three inches with a depth of three inches.

There may be provided a screw filler cap which can include a female syringe connector so that a hypodermic syringe may be used for forcing air out of the line which lines may be of copper tubing.

By removing air from the lines, it is possible to provide for gravity flow of the liquid anesthetic with a suitable pressure vent provided in the top of the reservoir.

The reservoir will desirably feed a liquid flowmeter, which may include a tubular element, for example, nine to ten inches in length and the markings of which will show cubic centimeters of liquid anesthetic vapor which is produced rather than the amount of liquid which is passing therethrough.

This flowmeter may desirably include two floating balls, one composed of Pyrex and the other of a sapphire either of which may be one-sixteenth of an inch in diameter with the Pyrex ball being lighter and the sapphire ball being heavier and with there being close tolerance between the outside diameter of the balls and the inside diameter of the vertical flowmeter calibrated tube.

The stops for the balls are desirably designed so that there will be no tendency of the balls to jam in either end of the tube.

From the vertical tubular flowmeter, the anesthesia agent is caused to flow to a meter reset valve which serves to displace the liquid and permit a ready setting to a new calibration.

For example, when the plunger is forced back in the liquid and is moved back into the reservoir, this causes the balls to move downwardly in the flowmeter.

On the other hand when moved in reverse and when the plunger is withdrawn, the liquid is allowed to return to the gravity of the reset valve, and the balls are displaced upwardly in the flowmeter.

Such a reset control valve will permit very rapid change in the flow rate without delay due to the close tolerance between the balls and the wall of the flowmeter.

Such close tolerance causes sufficient friction which will not permit an immediate response of the balls within the flowmeter so that they could be promptly moved to a new positon and to a new flow rate capacity.

Beyond the meter reset valve, there is located a metering control valve desirably with a conical shutoff seat which will work in conjunction with the liquid tubular flowmeter to give a direction reading in terms of vapor cubic centimeters of the liquid anesthetic being dispensed from the reservoir.

At or adjacent to or beyond the needle valve is a connection for a diluting flow of oxygen which will pass across or pick up the liquid fluoroethane which is promptly transposed into a vapor and then the mixture of oxygen and fluoroethane is carried to the breathing mask of the patient.

Desirably the fluoroethane is fed into the oxygen stream from a perforated tube extending beyond and fed from the needle valve.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a front perspective view of the complete application according to the present invention as it may be conveniently closed within the housing.

FIG. 2 is a separated view showing the various elements of the enclosed apparatus of FIG. 1 so as to more readily understand the steps and elements of the construction.

FIG. 3 is a transverse sectional view of the ends of the tubular flowmeter device.

FIG. 4 is a side perspective view of the insert element at the upper end of the flowmetering device to prevent jamming of the ball indicators.

FIG. 5 is a transverse sectional view taken upon the line 5—5 of FIG. 3 of the lower ball stop element.

FIG. 6 is a transverse sectional view upon an enlarged scale showing an alternative form of the upper ball stop or seat element for use on the flowmeter unit of FIG. 3.

FIG. 7 is a transverse longitudinal sectional view of the outlet meter valve.

FIG. 8 is a vertical transverse sectional view of anesthetic liquid reservoir.

FIG. 9 is a transverse longitudinal sectional view of the reset valve.

FIG. 10 is a fragmentary longitudinal sectional view showing the Y connection where the liquid disperses into and vaporizes into the oxygen stream being fed into the patient.

Referring to FIGS. 1 to 10, there is shown the reservoir A which receives the liquid anesthetic agent, such as Fluothane, which feeds the liquid flowmeter B.

From the liquid flowmeter B the liquid anesthetic agent will flow through and pass the displacement control valve C, shown in small scale in FIG. 2 and in large scale in FIG. 9.

From the displacement control valve C the liquid anesthetic will then flow through the micro-control valve D, which is of the needle type, to a Y-junction E, shown in small scale in FIG. 2 and in large scale in FIG. 10.

The oxygen will be supplied from the Schrader type, quick-connect attachment F through the oxygen flowmeter G.

The oxygen will flow from the vertical flowmeter G through the outlet connection H to the Y-junction E.

From the junction E the flow will be to the mask shown diagrammatically at J in FIGS. 1 and 2, whence it may be administered to the patient.

In the various sketches, the flow of the liquid anesthetic by itself is indicated by a single-headed arrow, whereas the flow of the oxygen is indicated by a double-headed arrow. The flow of the combined anesthetic agent and oxygen is indicated by the triple-headed arrow.

On the instrument frame and particularly on the base thereof as shown in FIG. 1, there will be provided an actuating handle K for the displacement control valve C, a knurled actuator L for the needle valve D and the manual control M for controlling the oxygen supply control valve.

Referring particularly to the liquid reservoir, which is shown in small scale in FIGS. 1 and 2 and in large scale in FIG. 8, such reservoir may consist of a cylindrical container 20 of aluminum, brass or some other material not affected by the Fluothane, with a flat bottom 21 and a flat cover 22, which may be provided with the mounting openings 23.

The cover 22 has a central threaded opening 24 which receives the filler cap 25 having the flanged projection 26, enabling it to be unscrewed and a liquid anesthetic filled thereinto.

Desirably inside of the reservoir A and directly under the opening 24 is the conical strainer 27 to prevent any foreign dust particles from passing into the reservoir A.

The bottom of the reservoir has a threaded opening 28 which receives the junction connection 29 having a central flow passage 30. This flow passage is covered by and protected by the strainer 31.

The cover 22 may also be provided with a vent member 32, which is screwed into an opening in the cover 22 as indicated at 33.

The flange 34 will limit the insertion of the vent unit 32.

The vent unit 32 has a conical socket 35, which may receive the nozzle of a syringe member 36 to permit injection of fluid into the chamber or reservoir A.

The unit or conical socket element 32 is particularly useful in that while acting as an air vent to let air into the reservoir, it also permits ready attachment of a nozzle of a syringe 36 to force fluid into the upper part of the reservoir, which is useful where the lines are to be cleaned of air or vapors.

Desirably, only atmospheric pressure is maintained in in the vessel A, with the anesthetic liquid being allowed to pass therefrom by gravity through the bottom wall 21, through the member 29.

However, a super-atmospheric pressure might be maintained by means of a pressure application through the nozzle shown at 36 in FIG. 8.

The front of the reservoir A may be provided with a sight glass insert 37, which will permit observation of the liquid level within the reservoir A.

The lower projecting threaded portion of the junction 29 is connected by the nut 50 to the upper flared portion 51 of the tubing 52.

This tubing is concealed inside of the housing structure 53 and 54 in the showing of FIG. 1, and the tubing will continue, as indicated at 55, to the junction connection 56 at the bottom of the mounting block 57. (See FIGS. 2 and 3.)

Said mounting block is placed in the bottom part of the housing 58 of FIG. 1.

The tubing, as indicated at 59 in FIG. 3, passes through the coupling nut 60, which has the sealing member 61 compressed around the end 62 of the tubing 59 by the threaded nipple 63 of the junction element 56. (See FIG. 3.)

The junction element 56 has a central flow passage 64 and a threaded outlet nipple 65, which is screwed into the tapped portion 66 of the socket 67 in the block 57.

The block 57 has the two side openings 68, through which mounting screws may be inserted. (See FIGS. 2 and 3.)

The block 57 has a socket 69 into which the lower enlarged diameter portion 70 of the vertical flowmeter tube B may be tightly inserted.

Extending through the interior 71 of the lower portion 70 of the flowmeter tube B is the cylindrical brass, stainless steel or aluminum member 72 having the slots 73 in the side thereof, with the upper end 74 projecting into the narrow diameter tube portion 75.

This upper end 74 will act as a lower stop for the two balls 76 and 77 which may assume different positions in the narrow portion 75 of the tube B at the graduations, as indicated at 78, extending along the length of the narrow portion of the tube.

The position of the balls 76 and 77 in respect to the graduation 78 will indicate the rate of flow passing upwardly through the tubular element B.

The upper ball desirably is of transparent glass or is a Pyrex ball which closely fits the interior of the narrow portion 75, while the lower ball 76 is a differentially colored sapphire ball 76, which is heavier than the glass ball 77 so that it will always assume a lower position.

The upper end of the flowmeter tube is again of increased diameter, as indicated at 79 in FIG. 3, and it closely fits, as indicated at 80, into the socket 81 in the lower portion 82 of the block 83.

The block 83 has the mounted openings 84 which receive the screws or bolts 85.

The upper end of the block 83 is provided with the socket 86 which receives the threaded nipple 87 of the junction member 88.

The junction member 88 has a threaded outlet nipple 89 which has a central socket 90 to receive the end 91 of the tubing 92, which is positioned in the housing structure 53 of FIG. 1.

The clamping nut 94 will clamp the sealing members 93 around the lower end 91 of the tube 92.

As a top stop for the balls 76 and 77, and to prevent them from jamming, is the element 95. (See FIGS. 3 and 4).

The element 95 has a plurality of fins 96 with curved bottom edges 97, which fit into the upper end 98 of the vertical tubular meter B.

They may be notched, as indicated at 99, so as to lock into the interior side of the widened diameter portion 99 of the tube B.

These fins 96 extend downwardly from a cylindrical element 100 in the sides of which are the vertical flow passages 101.

The spaces between the radial fins 96 and their obliquely cut off portions 102 and their vertical peripheral passageways 101 will permit the anesthetic fluid to pass from the vertically graduated flowmeter tube B into the copper or metallic tubing 92.

Then the liquid anesthetic will flow through the tubing 92 to the displacement control valve of FIG. 9.

This displacement control valve has a cylindrical body 120 with a closed bottom 121 and a mounting flange 122 at the other end, with the mounting openings 123.

At the outlet end, the tubing is connected to the nipple element 124 by the cap nut 125, which seals in position the sealing members 126.

The anesthetic liquid will flow inwardly through the bore 127 in the wall of the cylindrical member 120 and into the interior chamber 128.

Into the chamber 128 projects the cylindrical member 129 having the enlarged threaded portion 130, which may be screwed into and out of the tapped interior portion 131 inside the cylindrical body 120.

The threaded portion 130 is provided with an outwardly extending upper rod 132, to the upper end 133 of which is connected the handle member K by the set screw 134.

The stem 132 is sealed by the nipple member 135, having the O ring 136 which has a nipple 137 threaded into the outer portion of the tapped interior 131.

The gasket 138 will form a tight seal.

The function of the displacement control valve of FIG. 9 is to enable the balls 76 and 77 quickly to be set to another position along the graduations 78 when the flow of anesthetic liquid is to be increased or decreased.

This change otherwise would take place very slowly, due to the close fit of the balls 76 and 77 in the interior of the tube B.

By screwing in the piston 129 to decrease the volume of the chamber 128, it is possible to force the balls 76 and 77 quickly up to a new position.

On the other hand, when it is desired to decrease the flow and reset the balls 76 and 77 to a lower position, the piston 129 may be turned outwardly, increasing the volume of the chamber 128 and causing a rapid change in position of the balls 76 and 77.

The displacement control valve of FIG. 9 does not change the rate of flow but it does rapidly change the position of the balls 76 and 77 to the new greater flow of the anesthetic liquid when such change is to take place.

The gasket 138 is desirably of a fluorinated plastic, such as Teflon, whereas the O ring 136 is desirably of butyl rubber.

The liquid anesthetic will flow out the side wall of the cylindrical housing 120 through the bore 139 leading into the nipple 140. The nipple 140 receives the interiorly threaded cap 141 which holds the sealing members in position against the tubing 143.

The tubing 143 leads to the needle valve D shown in detail in FIG. 7. The tubing 143 is clamped to the threaded inlet nipple 142a by the coupling nut 143a which clamps the sealing sleeves 144 and 145 in position around the end 146 of the tubing 143. This tubing is stopped by the shoulder 147.

The valve body 148 has a tapered recess 149 into which the tapered needle nose element 150 may be inserted.

This tapered needle nose element 150 projects away from the body 151, which has a groove 152 therein receiving the butyl rubber O ring 153.

The body 151 then projects through the chamber 154 and through the passageway 155 of the coupling element 156.

The coupling element 156 has a threaded end 157 which screws into the threaded cup 158 of the body 148.

The element 156 also has the threaded extension 159 which receives the clamping nut 160 to mount the needle valve structure D on the plate 161, forming the front of the lower housing 162 of the unit shown in FIG. 1.

The coupling element 156 also has the projecting internally threaded element 162 into which the threaded end 163 of the valve body 151 is screwed.

The knurled cap element L (see FIG. 7) has a skirt 164 which closely fits over the outside of the element 162.

The knurled member L has a recess 165 which receives the reduced diameter end 166 of the threaded element 163. The set screw 167 holds the cap L in position on the projection 166.

The liquid anesthetic passes the needle valve 150 and its seat 149 will pass the conical portion 168 and flow into the bore 169. (See FIG. 7.)

The bore 169 communicates with the tubing 170, which is held in position by means of the clamping nut 171 holding the sealing members 172 and 173 tightly in position around the tubing 170.

The tubing 170 will then lead to the Y-connection E.

The Y-connection E has a main inlet branch or tubing 200 for the inlet tube 201 for the liquid anesthetic and a branch connection 202 for the oxygen. (See particularly FIG. 10.)

The tube 201 is concentrically held in position inside of the tubing 200 by the junction 203 which has a threaded reduced diameter portion 204 receiving the connection nut 205.

This connection nut 205 has a socket 206 which receives the end of the tubing 200.

The other threaded end nipple 207 of the junction 203 has the sealing rings 208 which are clamped in position inside of the clamping nut 209 to form a liquid-tight connection between the tube 170 and the coupling nut 203.

Both the outlet end of the tubing 170 and the inlet end of the tubing 201 are inserted in liquid-tight fashion in the central passageway 210 of the coupling 203.

The tubing 201 will project past the junction 211 where the tubing 202 joins the tubing 200 and it will then extend up to a point 212 inside of the outlet tube 213.

The outlet end of the tubing 201 has a plurality of transverse slots 213a in one side in the lower edge thereof which will permit the liquid anesthetic to drop out of such slots into the flow of oxygen indicated by the double arrow 214 in FIG. 10.

This flow of oxygen will pick up the droplets passing out of the slots 213a and will quickly vaporize them, so that in a portion 215 of the tube 213 there will be completely vaporized Fluothane which will flow in the direction indicated by the triple arrow 216, to be administered to the patient through the mask J.

A small amount of the liquid may also flow out of the open end 212 of the tube 201, as shown in FIG. 10.

The circular fins 217 around the tube 213 will regulate the temperature thereof so that it will be the same as the external atmosphere and the heat absorbed by the vaporization of the Fluothane passing through the slots 213a may be replenished through the fins 217 to prevent ice or moisture from freezing on the outside of the tube 213.

The oxygen feed apparatus shown at the right of FIG. 2 forms no part of the present invention but as shown it consists of a quick-connect element F which may be connected to an oxygen cylinder having a coupling connection at 218 to the tubing 219, which leads to the oxygen flow control valve M.

The oxygen will then flow up through the oxygen flowmeter tube G from the lower casing structure 220 to the upper casing structure 221.

It will then flow down through a tube not shown in the rear casing structure 222 to the outlet 223.

The outlet 223 connects to the tube 224, which in turn leads to the Y-tube member 202.

From the tube 215 of FIG. 10 the mixture of vaporized Fluothane carried by the oxygen stream will pass, as indicated by the arrows 225 and 226, through the tubing 227 and 228 (see FIG. 2) to the apparatus for administering the same to the patient, diagrammatically indicated by the element J in FIGS. 1 and 2.

In the apparatus shown, it is possible to most carefully regulate the flow and administration of Fluothane so that there will be an accuracy of calibration with practically no variation in delivery concentration due to changes in external and atmospheric pressure.

Furthermore, the apparatus disclosed will not have its flow varied due to vibration or movement of bodies, near or adjacent thereto, and it may be readily set to a new predetermined flow by the control displacement element C.

The graduations of the tube B desirably show the volume of Fluothane which is being administered and it may be regulated to show rates of flow of four litres to 14 litres per minute.

At no time will there be a likelihood of a sudden high concentration of the Fluothane and at all times the concentration desired will not exceed 2% and there will be no danger of excess.

The various metal parts thereon may be of stainless steel or copper and the sealing members may be of Teflon or butyl rubber.

The reservoir A may be readily filled to permit gravity flow into the meter tube B and a hydraulic hinge inserted into the connection 32 in the cover 22 of the reservoir may be used for forcing air out of the lines to assure smooth, uniform flow by gravity.

The graduations at 78 on the tube B are desirably in cubic centimeters of liquid anesthetic vapor rather than in liquid centimeters.

The lower stop 74 and the upper stop shown in FIG. 4 will prevent sticking of the balls in either top or bottom position and the member 72 may be formed from a side-slotted hypodermic needle.

The meter recessed valve of FIG. 7 enables ready setting of the balls 76 and 77 to a new flow position, which new flow is established by manipulation of the needle valve D of FIG. 7.

This will give immediate response of the balls 76 and 77 to the new flow rate established by a new setting of the needle valve D. The oxygen valve M is also desirably of the needle valve type.

The ends of the tube B are desirably held in the blocks 57 and 83 by means of lead oxide and glycerine sealing composition.

It has been found particularly that the entire apparatus will most accurately determine the flow of the Fluothane throughout an atmospheric range of 60° F. to 95° F., or 18° C. to 35° C.

In the alternative structure shown in FIG. 6, the balls 76 and 77 may be stopped in either top or bottom position by an insert 250 force-fitted into the tube B and having a central open flow passage 251.

In this case the ranged seat 252 should have a greater diameter than the balls 76 and 77 so that they will not stick therein and may be readily separated therefrom with the change in flow rate and the operation of the displacement valve of FIG. 9.

As many changes could be made in the above anesthesia apparatus, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a liquid anesthesia administration system comprising a reservoir for the liquid anesthetic of the nature of a fluorinated agent, a vertical flowmeter fed from said reservoir having movable indicator elements, a displacement control valve to regulate the positioning of the indicator elements receiving liquid anesthetic from the flowmeter, a needle valve to regulate the supply of liquid anesthetic from the control valve; the combination therewith of a mixer to mix the measured anesthetic from the needle valve with oxygen for administration to the patient, said mixer including a horizontal concentric tubular arrangement having an inside tube receiving measured anesthetic and an outside tube receiving oxygen having a plurality of outstanding temperature regulating circular fins, said inside tube terminating within the outside tube and having a plurality of transverse closely spaced slots adjacent the terminating portion of the outside tube on the lower side of the inside tube to permit droplets of anesthetic to drop out of the slots into the oxygen flowing through the outside tube.

2. In a liquid anesthesia administration system comprising a reservoir for the liquid anesthetic of the nature of a fluorinated agent, a vertical flowmeter fed from said reservoir having movable indicator elements, a displacement control valve to regulate the positioning of the indicator elements receiving liquid anesthetic from the flowmeter, a needle valve to regulate the supply of liquid anesthetic from the control valve; the combination therewith of a mixer to mix the measured anesthetic from the needle valve with oxygen for administration to the patient, said mixer including a horizontal concentric tubular arrangement having an inside tube receiving measured anesthetic and an outside tube receiving oxygen having a plurality of outstanding temperature regulating circular fins, said inside tube terminating within the outside tube and having a plurality of transverse closely spaced slots adjacent the terminating portion of the outside tube on the lower side of the inside tube to permit droplets of anesthetic to drop out of the slots into the oxygen flowing through the outside tube, said movable indicator elements consisting of an upper Pyrex ball and a lower sapphire ball movable in a graduated transparent tube forming said vertical flowmeter.

3. In a liquid anesthesia administration system comprising a reservoir for the liquid anesthetic of the nature of a fluorinated agent, a vertical flowmeter fed from said reservoir having movable indicator elements, a displacement control valve to regulate the positioning of the indicator elements receiving liquid anesthetic from the flowmeter, a needle valve to regulate the supply of liquid anesthetic from the control valve; the combination therewith of a mixer to mix the measured anesthetic from the needle valve with oxygen for administration to the patient, said mixer including a Y-junction member with a slotted tube being centrally positioned inside of the stream of incoming oxygen to feed droplets of the liquid anesthetic into the oxygen stream.

4. In a liquid anesthesia administration system comprising a reservoir for the liquid anesthetic of the nature of a fluorinated agent, a vertical flowmeter fed from said reservoir having movable indicator elements, a displacement control valve to regulate the positioning of the indicator elements receiving liquid anesthetic from the flowmeter, a needle valve to regulate the supply of liquid anesthetic from the control valve; the combination therewith of a mixer to mix the measured anesthetic from the needle valve with oxygen for administration to the patient, said mixer including a horizontal concentric tubular arrangement having an inside tube receiving measured anesthetic and an outside tube receiving oxygen having a plurality of outstanding temperature regulating circular fins, said inside tube terminating within the outside tube and having a plurality of transverse closely spaced slots adjacent the terminating portion of the outside tube on the lower side of the inside tube to permit droplets of anesthetic to drop out of the slots into the oxygen flowing through the outside tube, said displacement control valve consisting of a movable piston to force liquid anesthetic into or draw it out of said flowmeter and cause rapid adjustment in position of the movable indicator elements.

5. In a liquid anesthesia administration system comprising a reservoir for the liquid anesthetic of the nature of a fluorinated agent, a vertical flowmeter fed from said reservoir having movable indicator elements, a displacement control valve to regulate the positioning of the indicator elements receiving liquid anesthetic from the flowmeter, a needle valve to regulate the supply of liquid anesthetic from the control valve; the combination therewith of a mixer to mix the measured anesthetic from the needle valve with oxygen for administration to the patient, said mixer including a horizontal concentric tubular arrangement having an inside tube receiving measured anesthetic and an outside tube receiving oxygen having a plurality of outstanding temperature regulating circular fins, said inside tube terminating within the outside tube and having a plurality of transverse closely spaced slots adjacent the terminating portion of the outside tube on the lower side of the inside tube to permit droplets of anesthetic to drop out of the slots into the oxygen flowing through the outside tube, said reservoir consisting of a cylindrical container at a higher level than the flowmeter and having an inlet connection permitting venting of air to the top of the reservoir and gravity flow from the bottom of the reservoir and also permitting the connection of a syringe to flush the system.

References Cited in the file of this patent

UNITED STATES PATENTS

| | | |
|---|---|---|
| 1,947,923 | Schweitzer | Feb. 20, 1934 |
| 2,099,842 | Connell | Nov. 23, 1937 |
| 2,890,696 | Morris | June 16, 1959 |